(12) United States Patent
Iacopetti et al.

(10) Patent No.: US 10,287,188 B2
(45) Date of Patent: May 14, 2019

(54) ELECTRODE FOR ELECTROCHLORINATION PROCESSES AND METHOD OF MANUFACTURING THEREOF

(71) Applicant: INDUSTRIE DE NORA S.P.A., Milan (IT)

(72) Inventors: Luciano Iacopetti, Milan (IT); Alice Calderara, Milan (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 46 days.

(21) Appl. No.: 15/516,161

(22) PCT Filed: Oct. 23, 2015

(86) PCT No.: PCT/EP2015/074609
§ 371 (c)(1),
(2) Date: Mar. 31, 2017

(87) PCT Pub. No.: WO2016/066544
PCT Pub. Date: May 6, 2016

(65) Prior Publication Data
US 2017/0297928 A1      Oct. 19, 2017

(30) Foreign Application Priority Data

Oct. 27, 2014   (IT) .............................. MI2014A1838

(51) Int. Cl.
    C02F 1/46       (2006.01)
    C02F 1/461      (2006.01)
    (Continued)

(52) U.S. Cl.
    CPC ........ *C02F 1/46109* (2013.01); *C02F 1/4674* (2013.01); *C25B 1/26* (2013.01);
    (Continued)

(58) Field of Classification Search
    CPC ................ C02F 1/46109; C02F 1/4674; C02F 2001/46142; C02F 2103/008;
    (Continued)

(56) References Cited

U.S. PATENT DOCUMENTS 4,234,405 A * 11/1980 Hesketh .............. C25B 11/0442
                                                    204/290.08
4,426,263 A *  1/1984 Hardee ............... C25B 11/0484
                                                    205/556
(Continued)

FOREIGN PATENT DOCUMENTS

CN          103255434 A     8/2013

OTHER PUBLICATIONS

International Search Report and Written Opinion for International Application No. PCT/EP2015/074609 dated Jan. 8, 2016 (7 pages).

*Primary Examiner* — Walter D. Griffin
*Assistant Examiner* — Cameron J Allen
(74) *Attorney, Agent, or Firm* — Lucas & Mercanti, LLP

(57) ABSTRACT

The invention relates to an electrode suitable for electrolytic treatments of dilute solutions of sodium chloride even at low temperatures. The electrode can be used in the generation of active chlorine-based biocidal agents in ballast water for marine applications. The electrode has a titanium substrate, an inner catalytic coating containing oxides of tantalum, ruthenium and iridium, and an outer catalytic coating containing oxides of titanium, ruthenium and of at least one of nickel, iron and cobalt.

10 Claims, 1 Drawing Sheet

(51) Int. Cl.
*C02F 1/467* (2006.01)
*C25B 11/04* (2006.01)
*C25B 1/26* (2006.01)
*C02F 103/00* (2006.01)

(52) U.S. Cl.
CPC ...... *C25B 11/0415* (2013.01); *C25B 11/0484* (2013.01); *C02F 2001/46142* (2013.01); *C02F 2103/008* (2013.01); *C02F 2201/4613* (2013.01)

(58) Field of Classification Search
CPC .............. C02F 2201/4613; C02F 1/46; C25B 11/0415; C25B 11/0484; C25B 1/26
See application file for complete search history.

(56) References Cited

U.S. PATENT DOCUMENTS

| | | | | |
|---|---|---|---|---|
| 4,528,084 A | * | 7/1985 | Beer | .................. C25C 7/02 204/290.08 |
| 2005/0183952 A1 | | 8/2005 | Shimamune et al. | |
| 2013/0087450 A1 | | 4/2013 | Antozzi et al. | |

\* cited by examiner

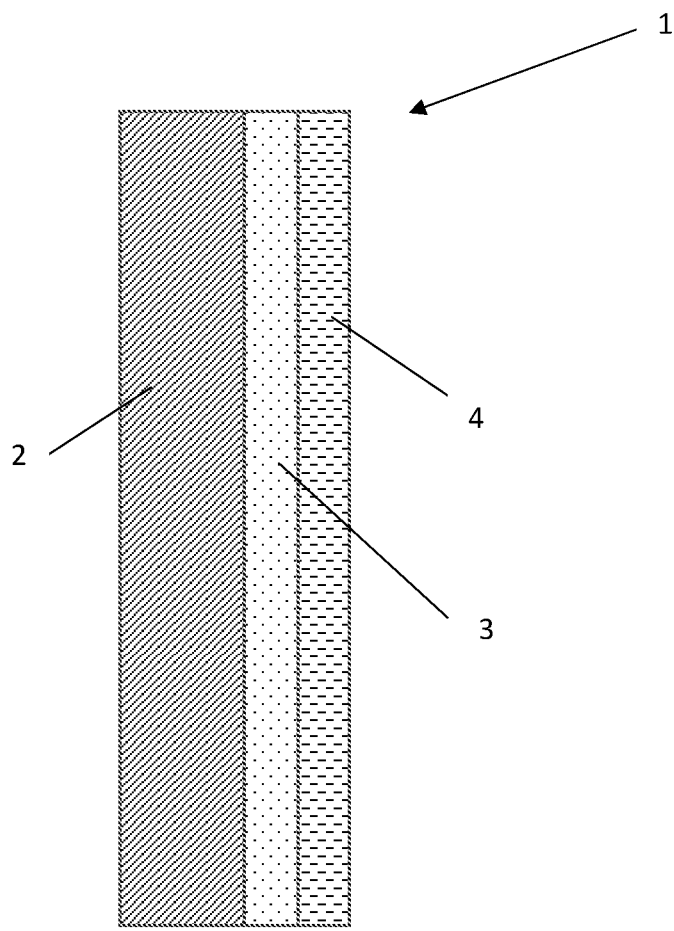

ELECTRODE FOR ELECTROCHLORINATION PROCESSES AND METHOD OF MANUFACTURING THEREOF

This application is a U.S. national stage of PCT/EP2015/074609 filed on Oct. 23, 2015 which claims the benefit of priority from Italian Patent Application No. MI2014A001838 filed Oct. 27, 2014 the contents of each of which are incorporated herein by reference.

FIELD OF THE INVENTION

The invention relates to an electrode suitable for use in electrochlorination cells, such as cells for biocidal treatment of ballast waters for naval applications.

BACKGROUND OF THE INVENTION

The electrolysis of seawater or other dilute aqueous solutions of sodium chloride with consequent generation of active chlorine, i.e. of a mixture of hypochlorite and other oxidizing species, finds several applications in the industry which take advantage of the biocidal and disinfecting properties of the product. An application of particular interest is the biocide treatment of ballast water employed in the nautical field. As it is known, in fact, the ballasting and balancing procedures performed on vessels when they are displaced or in the course of loading and unloading operations in harbours are carried out on an amount of seawater stored in dedicated compartments, which are emptied or filled accordingly. To avoid contaminating the discharge areas with biological species coming from different environments it is compulsory to carry out a preventive biocide treatment of the water to discharge, eliminating in particular all sorts of microorganisms. Formulations of anodes based on noble metal oxide-coated titanium substrates suitable for generating of active chlorine from sodium chloride are known; however, the known formulations are generally characterized by a poor selectivity and efficiency when operating with electrolytes at low sodium chloride concentration, in particular at low temperatures as is the case of seawater. The anodic generation of active chlorine in unseparated electrolytic cells, typical of electrochlorination processes, is furthermore counterbalanced by a cathodic generation of hydrogen associated with a local increase in alkalinity, which favours the rapid scaling of the cathode surfaces. In this regard, a periodic washing of the cathodes with hydrochloric acid is commonly performed; such process poses some safety and environmental issues. An alternative solution consists of carrying out the electrolysis between two electrodes of identical formulation, alternately operating one as the anode and the other as the cathode and vice versa, by periodically reversing the applied polarity: in this way, a self-cleaning effect of the scaled cathodes is obtained under the effect of the local acidification induced by the subsequent anodic functioning. The noble metal oxide-coated titanium anodes of the prior art, however, have a tendency to get deactivated during the cathodic operation, thus negatively affecting the overall costs of the technology.

It would be then desirable to provide an electrode suitable for use in electrochlorination cells overcoming the drawbacks of the prior art.

In particular, it would be desirable to provide an electrode having a good selectivity in the generation of active chlorine from dilute solutions of sodium chloride even at low temperature, with a suitable duration for an industrial application even when subjected to periodic reversal of its polarity.

SUMMARY OF THE INVENTION

Various aspects of the invention are set out in the accompanying claims.

Under one aspect, the invention relates to an electrode suitable for use in electrochlorination cells, comprising a titanium substrate, a first inner catalytic coating applied to the substrate containing a mixture of oxides of tantalum, ruthenium and iridium, an additional outer catalytic coating containing a mixture of oxides of titanium, ruthenium and at least one element selected from nickel, iron and cobalt. The titanium substrate may comprise a solid sheet or a foraminous structure (such as a punched sheet, an expanded sheet or a mesh) of optionally alloyed titanium metal. In one embodiment, the titanium substrate has an average roughness value $R_a$ ranging from 4 to 10 µm, in order to favour the optimal anchoring of the catalytic coatings; this roughness profile can be obtained through a selective etching of the grain boundaries of a titanium substrate in controlled metallurgical conditions: this can favour the anchoring of the coating layers, with particular reference to the inner catalytic coating in direct contact with the surface of substrate, in a wide range of specific loading. The roughness profile obtained can be controlled by measurements with a profilometer, as known in the art. In one embodiment, the total noble metal loading in the inner catalytic coating expressed as the sum of ruthenium and iridium ranges from 1 to 5 $g/m^2$. This can have the advantage of maximizing the noble metal exploitation throughout the life cycle of the electrode, maximizing the specific duration of the electrode for a given loading of noble metal applied, as observed in the course of an extensive testing campaign. In one embodiment, the weight composition of the outer catalytic coating comprises 30-60% of Ru, 35-70% of Ti, and 1-8% as the sum of Fe, Co and Ni. Formulations within this range have proven optimal to balance the catalytic activity of the electrode, its selectivity and its operative lifetime, particularly working with diluted electrolytes—for example with NaCl at a concentration below 20 g/l—even at low temperature, for example below 20° C. For the purpose of ensuring an optimal functioning in electrochlorination cells, it can be preferable to distribute the noble metal in the formulation of the catalytic coatings so that it is predominantly concentrated in the outermost layer. This can have the advantage of providing better performances in terms of catalytic activity and durability for a given electrode cost. In one embodiment, the weight ratio of the content of ruthenium in the outer catalytic coating to the noble metal content expressed as the sum of ruthenium and iridium in the inner catalytic coating is hence comprised between 3 and 10.

Under another aspect, the invention relates to a method for the manufacturing of an electrode as hereinbefore described comprising the sequential steps of etching of a titanium substrate in an acidic solution to impart a controlled roughness profile thereto, verifiable by a profilometer detection; application of a solution of tantalum, ruthenium and iridium compounds to the etched substrate, with subsequent thermal decomposition at a temperature above 400° C. and formation of an inner catalytic coating; application of a solution of compounds of titanium, ruthenium and at least one element selected from the group consisting of nickel, iron and cobalt to the inner catalytic coating; subsequent thermal decomposition at a temperature above 400° C. until forming an outer catalytic coating. In one embodiment, the etching step is carried out at 80-90° C. in 20-30% by weight sulphuric acid for a time sufficient to impart a weight loss of 150-250 g/m² to the substrate. This can have the advantage of localizing the dissolution of the titanium substrate at the grain boundaries, favouring the anchoring of the catalytic coatings in a broader range of specific loading.

Under another aspect, the invention relates to a process for the biocidal treatment of an aqueous solution of sodium chloride, for example a ballast water for marine applications, comprising the electrolysis of at least part of the solution in an electrolytic cell equipped with one or more pairs of electrodes as hereinbefore described with generation of active chlorine. In one embodiment, the process includes the periodic reversal of the electrode polarity.

BRIEF DESCRIPTION OF THE DRAWING

The FIGURE shows an electrode (1) comprising a titanium substrate (2) with a first inner catalytic coating (3) applied to the substrate and an additional outer catalytic coating (4) according to the invention.

DETAILED DESCRIPTION OF THE INVENTION

The following examples are included to demonstrate particular embodiments of the invention, whose practicability has been largely verified in the claimed range of values. It should be appreciated by those of skill in the art that the compositions and techniques disclosed in the examples which follow represent compositions and techniques discovered by the inventors to function well in the practice of the invention; however, those of skill in the art should, in light of the present disclosure, appreciate that many changes can be made in the specific embodiments which are disclosed and still obtain a like or similar result without departing from the scope of the invention.

EXAMPLE 1

A 1 mm-thick solid sheet of titanium grade 1, with a total area of 0.5 m², was etched in 27% by weight $H_2SO_4$ at 87° C. in cycles of 15 minutes for a total of five cycles, until observing a weight loss of 175.5 g/m². The resulting roughness profile was characterized by valleys localized at the grain boundary, as shown by a SEM investigation, and the average roughness value $R_a$ was found to be comprised between 8.6 and 10 μm as determined with a profilometer through measurements at various points of the surface. The substrate thus obtained was subdivided into samples of 130 mm×110 mm. The different samples were provided with catalytic coatings according to various formulations, the most significant of which are reported in Table 1. For all the reported samples, the inner catalytic coating was deposited by application of an aqueous solution, acidified with hydrochloric acid, of $RuCl_3$, $H_2IrCl_6$ and $TaCl_5$ in 5 coats, with intermediate drying at 50° C. for 5 minutes and thermal decomposition at 480° C. for 15 minutes after each coat. The outer catalytic coating was deposited with the same procedure, in a number of coats ranging between 25 and 40, selecting the precursors of the corresponding hydrochloric acid-acidified aqueous solution between $RuCl_3$, $TiCl_3$, $Fe(NO_3)_3$, $NiCl_2$ and $CoCl_2$.

| Sample # | Inner layer composition (wt %) | Precious metal loading ($g_{[Ru+Ir]}/m^2$) | Outer layer composition (wt %) | Precious metal loading ($g_{[Ru]}/m^2$) |
|---|---|---|---|---|
| A1 | Ru 32.5, 32.5 Ir, Ta 35 | 3.27 | Ru 46.25, 50 Ti, Fe 2.5, Ni 1.25 | 12.1 |
| A2 | Ru 32.5, 32.5 Ir, Ta 35 | 3.25 | Ru 46.25, 50 Ti, Fe 2.5, Ni 1.25 | 16.1 |
| A3 | Ru 32.5, 32.5 Ir, Ta 35 | 3.27 | Ru 46.25, 50 Ti, Fe 2.5, Ni 1.25 | 31.4 |
| A4 | Ru 32.5, 32.5 Ir, Ta 35 | 3.20 | Ru 40, Ti 54.5, 3.5 Fe, Co 2 | 18.3 |
| A5 | Ru 32.5, 32.5 Ir, Ta 35 | 3.18 | Ru 38, 60.7 Ti, Fe 1.3 | 11.0 |
| A6 | Ru 32.5, 32.5 Ir, Ta 35 | 3.20 | Ru 58, Ti 35.5, Ni 6.5 | 10.7 |
| C1 | Ru 32.5, 32.5 Ir, Ta 35 | 3.29 | Ru 45, Ti 55 | 15.7 |
| C2 | Ru 32.5, 32.5 Ir, Ta 35 | 3.11 | Ru 38, Ti 62 | 9.8 |

EXAMPLE 2

The samples of Example 1 were subjected to a standard test of electrodic activity, as a measure of potential corrected via Frequency Response Analysis (FRA) in 220 g/l NaCl, at a temperature of 85° C. and pH 2. All samples turned out to be active towards chlorine evolution, with anodic potentials between 1.35 and 1.36 V at 1000 A/m². The same samples were subjected to a standard faradic efficiency test in NaCl at 17 g/l, at a temperature of 15° C. and at a current density of 1200 A/m².

Samples A1, A2, A3, A4, A5 and A6 all showed an efficiency between 86 and 87%, versus values of 81.8% for sample C1 and 83.6% for sample C2.

The characteristics of duration of the same samples were also measured using a standard accelerated test, providing their operation in 17 g/l NaCl at a temperature of 15° C. and a current density of 2500 A/m², reversing the polarity every 12 hours starting with anodic operation. The electrode is considered deactivated when its anode potential is 1 V higher than the initial anodic potential.

Samples numbered A1 to A6 showed durations between 1200 hours (sample A4) and 1500 hours (A3), while samples C1 and C2 showed durations respectively of 500 and 460 hours.

The foregoing description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps. The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. An electrode in electrochlorination cells comprising:
   a titanium substrate
   an inner catalytic coating applied onto said substrate containing a mixture of oxides of tantalum, ruthenium and iridium and
   an outer catalytic coating applied on top of said inner catalytic coating containing a mixture of oxides of titanium, ruthenium and of at least one element selected from the group consisting of nickel, iron and cobalt.

2. The electrode according to claim 1 wherein said titanium substrate is characterised by a value of average roughness $R_a$ of 4 to 10 μm.

3. The electrode according to claim 1 wherein said inner catalytic coating has a total loading of noble metal expressed as the sum of ruthenium and iridium of 1 to 5 $g/m^2$.

4. The electrode according to claim 1, wherein the weight composition of said outer catalytic coating comprises 30-60% Ru, 35-70% Ti and 1-8% as the sum of Fe, Co and Ni.

5. The electrode according to claim 1, wherein the weight ratio of ruthenium content in said outer catalytic coating to noble metal content expressed as the sum of ruthenium and iridium in said inner catalytic coating is 3 to 10.

6. A method for the production of an electrode according to claim 1 comprising the following sequential steps:
   etching the titanium substrate in an acid solution until imparting a controlled roughness profile;
   applying a solution of tantalum, ruthenium and iridium compounds to the etched substrate, with subsequent thermal decomposition at a temperature above 400° C. and formation of an inner catalytic coating; and
   applying a solution of compounds of titanium, ruthenium and at least one element selected from the group consisting of nickel, iron and cobalt to the inner catalytic coating, with subsequent thermal decomposition at a temperature above 400° C. and formation of an outer catalytic coating.

7. The method according to claim 6 wherein said acid solution comprises 20-30% by weight sulphuric acid and said etching step is carried out at 80-90° C. until a weight loss of said substrate between 150 and 250 $g/m^2$ is obtained.

8. A process of biocidal treatment on an aqueous sodium chloride solution comprising electrolyzing the solution in an electrolytic cell equipped with a pair of electrodes according to claim 1 and forming of active chlorine.

9. The process according to claim 8, further comprising the periodic reversal of the polarity of the electrodes of said pair.

10. The process according to claim 8 in which said aqueous solution of sodium chloride is a ballast water for marine applications.

* * * * *